(No Model.)
H. PARTRICK.
METHOD OF MAKING HATS.
No. 408,512. Patented Aug. 6, 1889.
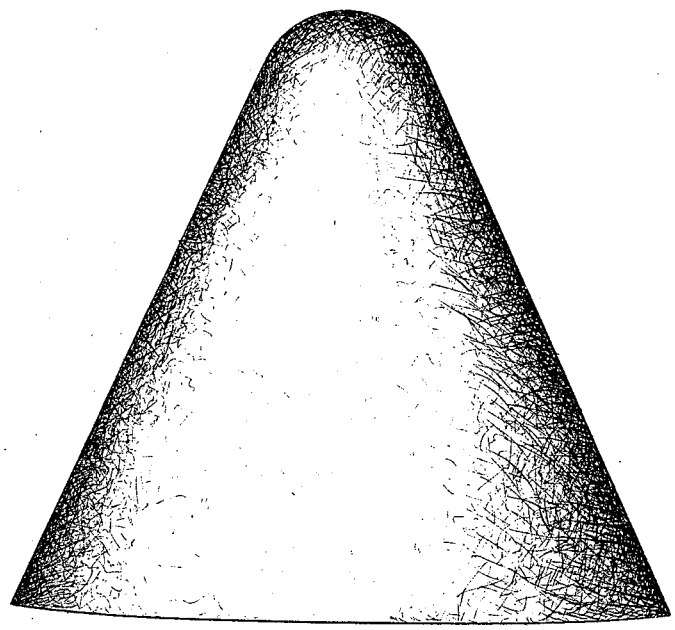
Witnesses
C. M. Newman,
Bertha E. Lee.
Inventor
Hawley Partrick
By A. M. Wooster
Atty.

UNITED STATES PATENT OFFICE.

HAWLEY PARTRICK, OF DANBURY, CONNECTICUT.

METHOD OF MAKING HATS.

SPECIFICATION forming part of Letters Patent No. 408,512, dated August 6, 1889.

Application filed November 16, 1888. Serial No. 291,001. (No model.)

*To all whom it may concern:*

Be it known that I, HAWLEY PARTRICK, a citizen of the United States, residing at Danbury, in the county of Fairfield and State of Connecticut, have invented certain new and useful Improvements in the Method of Making Hats; and I do hereby declare the following to be a full, clear, and exact description of the invention, such as will enable others skilled in the art to which it appertains to make and use the same.

My invention has for its object to cheapen the manufacture of hats by lessening the number of operations through which the bodies must pass, and thereby shortening the time required to produce a hat-body ready for the various operations of curling, setting, finishing, &c.

The ordinary steps in the manufacture of fur hat-bodies are as follows: first, forming the body upon a rotating cone in an exhaust-chamber; second, sizing or felting the bodies; third, shaving; fourth, stiffening, for the better grades of hats a wine-stiff being used—that is, a stiff consisting of fine qualities of gum dissolved in alcohol or an equivalent solvent—and for the cheaper grades of hats inferior grades of gums dissolved in an alkaline solution. After stiffening the hats they require to be dried either by heat or steam. This is the fifth operation and occupies from six to twelve hours. Under special circumstances, with very light hat-bodies and a very high temperature, it may be completed in two hours. After being thoroughly dried the bodies are, sixth, steamed for from twenty minutes to half an hour to drive the stiff from the surface into the body. At least sixty pounds pressure is required, the operation being of course performed in a close chamber. The seventh operation is the immersion of the bodies in an acid bath for about twelve hours to set the stiff. The eighth operation is immersion in a bath of clean water to soak out the acid. The ninth operation is stretching, the tenth dyeing or coloring, and the eleventh blocking out. The hats are then ready for the various steps or operations of curling, setting, finishing, &c.

After spending a great deal of time experimenting in the manufacture of hats, I have discovered that by certain novel improvements in the method of treating and manipulating the bodies I am enabled to dispense with the operations of drying, setting in acid water, and soaking out. I thus save in every lot of hats many hours of time, which is a feature of almost incalculable value during the busy season. I avoid three double handlings of the hats heretofore found indispensable. I mean by this the placing of the bodies in piles and conveying them from the place where one operation is performed to the place where another operation is to be performed and then unloading them again; and, furthermore, I save the skilled labor which is required in performing the three operations referred to, as either of these operations, if not performed in a skillful manner, may result in injuring a large number of the bodies, if not in ruining the entire lot.

The accompanying drawing, forming part of this specification, illustrates a hat-body ready to be blocked out.

It will be seen that my present invention dispenses with the operations specified as the "fifth," "seventh," and "eighth" operations in the method of treating and manipulating the bodies to prepare them for the operations of curling, finishing, &c.

In carrying out my invention the hats are formed, sized, and shaved in the ordinary manner. An oil-stiff is then applied in the usual manner—that is, with a brush. After applying the stiff the bodies may be taken at once to a steaming-chamber and steamed to drive the stiff from the surface into the bodies. After steaming the usual length of time the bodies are taken from the steaming-chamber and stretched, colored, and blocked.

The oil-stiffening which I preferably use consists of the following ingredients, combined in substantially the proportions stated, viz: shellac, sixty-five to seventy-five pounds; rosin, twenty-five to fifty pounds; water, eighteen gallons; borax, sufficient quantity dissolved in water to cut the gums, ordinarily about ten pounds; oil, (cut preferably with sulphuric ether,) one gallon; salt, eight to fifteen ounces.

Having thus described my invention, I claim—

The herein-described improvement in the art of making hat-bodies, the same consisting in the forming, sizing, and shaving the bodies in the usual manner, then applying an oil-stiff, and then steaming the bodies in the usual manner, after which they are ready to be stretched, colored, and blocked.

In testimony whereof I affix my signature in presence of two witnesses.

HAWLEY PARTRICK.

Witnesses:
A. M. WOOSTER,
BERTHA E. LEE.